455-811 AU 233 EX
FIP3106 XR 3,863,064

United States Patent [19]

Doyle et al.

[11] 3,863,064
[45] Jan. 28, 1975

[54] DIFFERENTIAL RETROCOMMUNICATOR

[75] Inventors: Walter M. Doyle, Utica, N.Y.; Matthew B. White, Newport Beach, Calif.

[73] Assignee: Philco-Ford Corporation, Philadelphia, Pa.

[22] Filed: Jan. 3, 1972

[21] Appl. No.: 214,617

[52] U.S. Cl. .................... 250/199, 325/15
[51] Int. Cl. .................... 331 94.5, H04b 9/00
[58] Field of Search ....... 250/199; 325/15; 331/94.5

[56] References Cited

UNITED STATES PATENTS

| | | | |
|---|---|---|---|
| 3,175,088 | 3/1965 | Herriott | 250/199 |
| 3,433,960 | 3/1969 | Minott | 250/199 |
| 3,527,532 | 9/1970 | Macken | 250/199 X |
| 3,584,220 | 6/1971 | Nomura et al. | 250/199 |
| 3,598,491 | 8/1971 | Hess et al. | 250/199 |

FOREIGN PATENTS OR APPLICATIONS

| | | | |
|---|---|---|---|
| 1,269,545 | 5/1968 | Germany | 250/199 |

*Primary Examiner*—Benjamin R. Padgett
*Assistant Examiner*—P. A. Nelson
*Attorney, Agent, or Firm*—Robert D. Sanborn; Gail W. Woodward

[57] ABSTRACT

An optical communications terminal employs two retrodirective reflective elements, one of which is modulated along the optical beam axis. The unmodulated return beam provides a reference for comparison with the modulated beam to enable heterodyne demodulation. If the primary source is a dual-polarization laser having a controlled frequency offset between the orthogonally polarized outputs, polarizing optics can be employed at the terminal to separate the primary beams. Each beam can be applied to a separate retroreflector so that one reflected beam is modulated with respect to the other. The two beams are returned back to the source where they can be heterodyned in a photodetector and demodulated using conventional FM or PM receiver techniques. This provides a communications system having a passive terminal and a high degree of immunity to noise and path turbulence interference.

10 Claims, 5 Drawing Figures

INVENTORS
WALTER M. DOYLE
MATTHEW B. WHITE
BY Gail W. Woodward
AGENT

DIFFERENTIAL RETROCOMMUNICATOR

BACKGROUND OF THE INVENTION

A simple communications system involves two terminals, each having a transmitter and a receiver to provide two-way contact. Both terminals are considered active because each can transmit by means of a local power source. In a retrocommunication terminal the received signal is merely reflected back to its source so that only one terminal need be active. The passive terminal may include a receiver to extract information from the input signal and provision is made to modulate the reflected signal so that two way communication is possible, but the passive terminal does not have a separate transmitter.

Optical retrocommunications systems have long been recognized as useful in situations where it is not practical to provide a full complement of equipment at one of the terminals. This can be the case where the terminal is to be located in a dangerous or inaccessable region. Also, where weight or power supply limitations are imposed, it can be very advantageous to employ a retrocommunicator.

The simplest reflecting device is a flat mirror oriented to return the transmitted beam to its source. However such a device must be precisely oriented — a requirement that makes a single flat mirror virtually useless as a retroreflector.

Typically an optical retroreflector is composed of three mirrors arranged to form the corner of a cube. The mirrors must be precisely oriented and the assembly is called a corner-cube reflector. Alternatively it can be made by grinding an actual corner cube from a solid piece of glass, the surfaces of which are polished. The three surfaces forming the corner are made reflective as by silvering. The fourth face, the one opposite the corner, is polished flat and, if desired, provided with an antireflective coating. Such a device will reflect an incoming beam of light back along its arrival axis and will act as an efficient reflector that does not require precise orientation. The reflected light can be modulated by means of a shutter located in front of the transparent face. This enables information to be superimposed on the light beam at the retrodirective terminal.

The main advantage of a retrocommunications system is that virtually all of the equipment is located at one terminal where weight, power, and complexity problems are not serious factors. In one early proposal for use in trench warfare, the retrocommunicator was to be located in front line trenches for communicating with rear trenches. Obviously the front line equipment must be simple, portable, light weight, and reliable. More recently it has been proposed to locate the retrocommunicator in a satellite for communications with a ground station. A ground based laser source directs a light beam at the satellite and the reflected beam, sensed by a receiver using suitable optics, can carry information applied by a simple modulation arrangement carried by the retrocommunicator on the satellite. In still another application it has been proposed to air-drop or otherwise install modulatable retrocommunicating reflectors in enemy held territory for gathering intelligence data. Such communications points can be surveyed by suitably equipped high-flying aircraft.

Prior art retrocommunicators have operated by modulation systems that produce amplitude modulation of the reflected light beam. Such systems are useful but they suffer from noise pickup and in particular are very subject to noise induced by atmospheric turbulence. While such considerations are not a problem in space, ground based or atmospheric systems will be acutely susceptible.

SUMMARY OF THE INVENTION

It is an object of this invention to provide a retrodirective reflector having at least two reflected signals so that noise and path turbulence effects can be minimized.

It is a further object to employ such a reflector with a dual polarization laser source in which the orthogonal outputs are applied to separate reflector elements.

It is a feature of the invention to provide for modulation of the reflected signals in differential fashion so that one beam acts as a reference with respect to the other.

These and other objects and features are achieved by incorporating two retrodirective reflectors into a single housing. One of the reflectors is modulated along the optic axis with respect to the other so that its output is Doppler or phase modulated. The two reflected signals are heterodyned at the receiver and frequency or phase demodulation is employed to recover the intelligence applied at the modulator.

In a preferred embodiment, the transmitter source is a dual polarization laser with the frequency offset adjusted to some convenient value. At the retroreflecting terminal the two polarizations are separated and one is applied to one reflector while the orthogonal polarization is applied to the other reflector. When one reflector is modulated along the optical axis, the related reflected beam is Doppler or phase modulated with respect to the other or reference beam. At the receiver the two reflected beams are heterodyned in a photodetector, the output of which is fed to a conventional FM or PM demodulator tuned to the offset frequency of the dual polarization laser. If FM is employed, a large modulation index can be achieved and a considerable noise immunity can be made available. More importantly, since both the modulated and reference beams traverse the same optical path, turbulence and other path induced effects cancel at the receiver. Thus a great deal of noise immunity can be achieved in such a system.

DESCRIPTION OF THE INVENTION

Figure 1:
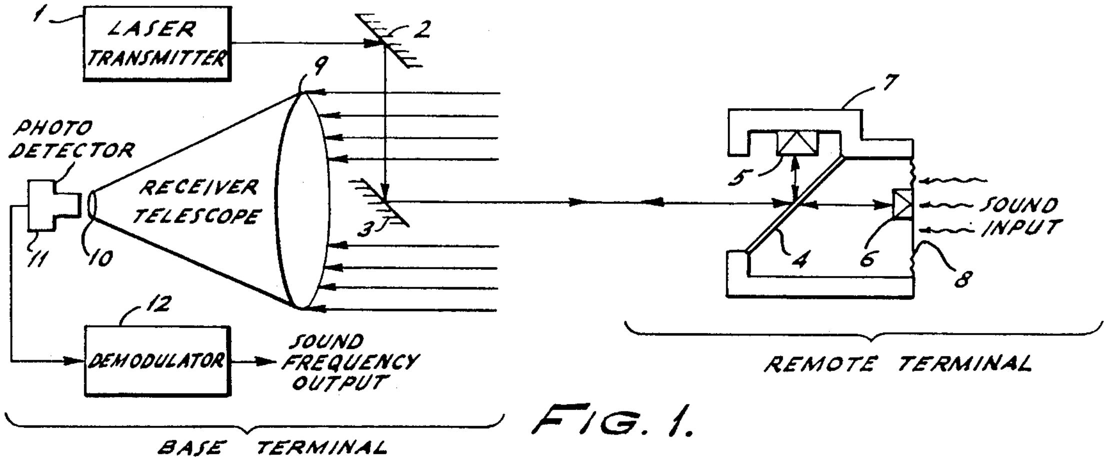
FIG. 1 shows the elements of a basic differential retrocommunicator.

FIG. 1 shows the essential elements of invention. At the base terminal a source of light, preferably coherent such as a laser 1, emits a narrow beam of energy that is directed toward a remote terminal by means of two 45° front-surface mirrors 2 and 3. At the remote terminal a beam splitter 4 having a transmission of about 50 percent splits the incoming beam into two components and directs them to a pair of corner cube reflectors 5 and 6. Reflector 5 is rigidly mounted on the remote terminal housing 7 while reflector 6 is secured to a diaphragm 8 that will move in accordance with ambient sound signals. In the absence of any sound, the two light beams are reflected unmodulated back along the arrival axis. Since corner cube reflectors are used, the housing 7 does not have to be precisely aimed at the base terminal. An approximate orientation is all that is required.

The return beam is picked up at the base terminal with an optical system having a relatively large aperture. A telescope comprising objective lens 9 and eyepiece lens 10 is collimated with the laser transmission path so that any reflected light will be directed onto photodetector 11. In the absence of modulation, the photodetector will produce a direct current output. When diaphragm 8 is vibrated by a sound input, reflector 6 will move along the optical axis thereby producing phase modulation of the reflected light. Since photodetector 11 is a nonlinear transducer, the optical signals it receives from reflectors 5 and 6 will be heterodyned and the electrical output will contain a component with amplitude proportional to the phase difference of these optical signals. The output of demodulator 12 thereby reproduces the input at diaphragm 8 in terms of a signal voltage.

While such a system could be useful under certain conditions it produces considerable distortion and would in general be unsuitable for voice or music reproduction. For example the excursions of diaphragm 8 will produce the same output at demodulator 12 regardless of which direction it moves. Therefore all sounds are doubled in frequency and would require considerable electronic processing to avoid distortion.

Figure 2:
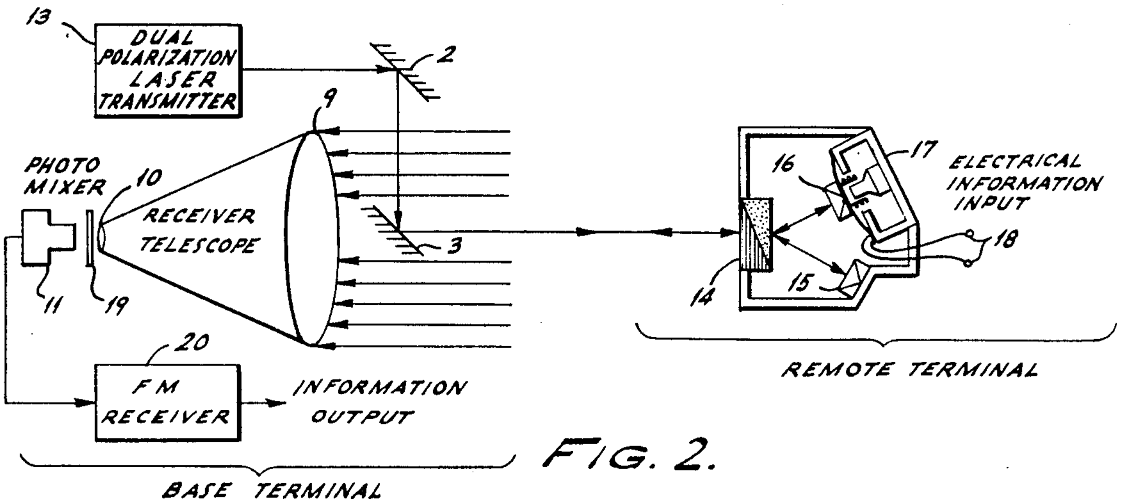
FIG. 2 shows a differential retrocommunicator for use with a dual polarization laser.

FIG. 2 shows a preferred system using a dual polarization laser 13 as the transmitter. Details of this device are disclosed in our U.S. Pat. No. 3,500,233. Laser 13 provides two output beams that are mutually orthogonal and is adjusted to provide beams having a convenient frequency difference. At the remote terminal Wollaston prism 14 causes the orthogonally polarized signals from transmitter 13 to diverge. Corner cube reflectors 15 and 16 are located to intercept the diverged beams. Reflector 16 is shown mounted on transducer 17 which is similar to the voice coil driver mechanism in a conventional permanent magnet loudspeaker. Electrical input at leads 18 will cause the reflector 16 to move along the optical input axis. After reflection the beams from reflectors 15 and 16 will again traverse the Wollaston prism 14 which reconverges them. They then return back to the base terminal along the same optical path. Large aperture receiver telescope comprising lenses 9 and 10 applies the return beams from the remote terminal to photomixer 11. However polarizer 19, oriented at about 45° with respect to the polarization of the return beams is required because orthogonally polarized beams will not heterodyne in a photomixer directly.

In the absence of modulation at leads 18, photomixer 11 will produce a signal having a frequency equal to the separation of the beams emitted by transmitter 13. This constitutes a carrier signal. When modulation is applied to leads 18 the beam returned from reflector 16 will be Doppler or phase modulated with respect to the beam returned from reflector 15. At the output of photomixer 11 this modulation is in the form of frequency or phase modulation of the carrier that is detected by receiver 20 which is tuned to the above mentioned carrier.

In an actual system using a 1.15 micron Helium-Neon dual polarization laser, the separation was adjusted to about 100 MHz. The receiver 20 was a conventional portable FM radio. Transducer 17 was a conventional 12 inch radio speaker with the cone removed and reflector 16 cemented to the voice coil. At 400 Hz modulation an input of 2mw produced 50 kHz deviation. The system was easily capable of transmitting conventional audio information.

In the showing of FIG. 2 only one reflector is shown as being modulated. However, a second transducer could be employed to modulate reflector 15. In this event the input connections would be polarized so that the transducers are driven out of phase in order to produce differential beam modulation. This would double the modulation sensitivity.

While FIG. 1 and 2 both show co-axial optical systems, the device could be mounted side by side where the separation between terminals is large. This also applies to the transmitter and receiving telescope optics. In such a system the laser transmitter 1 or 13 would be mounted adjacent the receiving telescope objective 9 and the axes aligned. Reflectors 2 and 3 would be omitted. The retroreflectors 5 and 6 of FIG. 1 would be mounted side by side facing the transmitter and close enough together to both be within the transmitter beam. In the FIG. 2 showing, the Wollaston prism 14 would be eliminated and polarizing filters located in front of the side by side mounted retroreflectors. These polarizers would be orthogonally positioned to conform with the laser beam polarities.

Figures 3, 4, 5:
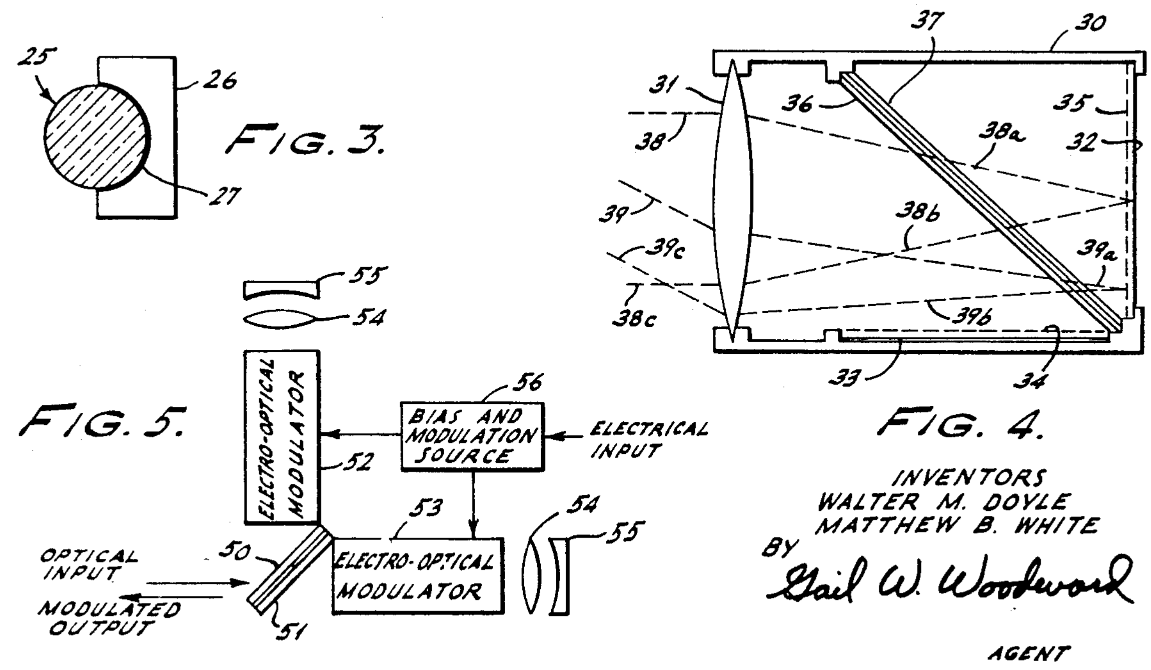
FIG. 3 shows the details of a cats eye reflector that could be used in place of the corner cube reflector.
FIG. 4 is a voice-powered dual polarization retroreflector.
FIG. 5 shows a high-modulation frequency capability differential retroreflector.

FIGS. 1 and 2 show the use of corner cube reflector elements. Clearly other forms of retrodirective reflector could be used. FIG. 3 shows an alternative known as the cats eye retroreflector. A sphere 25 of suitable optically transparent material is mounted in an opaque base 26. The surface of the sphere in contact with the base is preferably provided with a reflective coating 27. If the optical material has a refractive index of 2, a light beam striking the surface of the sphere will be focussed on the far side of the sphere and be reflected so as to reemerge back along the incident path. The action can be enhanced if the exposed face is provided with an anti-reflective coating. If the optical material is of an index other than 2, the device should include a lens in front of the sphere.

FIG. 4 shows an alternative embodiment for a simple sound powered retrocommunicator having polarization selection. Housing 30 has a lens 31 at one end and a metallized diaphragm 32 closes the other end of the housing and is located at the focus of lens 31. The housing also contains a flat mirror 33 perpendicular to diaphragm 32. Crossed polarizers 34 and 35 are located in front of mirror 33 and diaphragm 32 so that the orthogonal input beams will be selectively reflected from one or the other. A 50 percent rear surface beam splitter 36 and compensating plate 37 are mounted inside the housing 30 so that light from lens 31 equally illuminates reflector 33 and diaphragm 32. In operation the device is oriented so that it points generally toward the transmitter and so that polarizers 34 and 35 are approximately aligned with transmitter polarization. Diaphragm motion due to impinging sound will be translated to differential phase modulation of one reflected beam and will provide a suitable remote terminal for the system of FIG. 2.

To show how the device will not require critical alignment two ray paths are shown. On-axis ray 38 is refracted by lens 31 and one half, 38*a*, is passed to diaphragm 32 where it is reflected as shown. Half of this signal 38*b* is passed to lens 31 where it is refracted appearing as 38*c* back along the input axis. Off-axis beam 39 is refracted by lens 31 and one half, 39*a*, passed to diaphragm 32 where it is reflected. Half of this signal, 39*b*, is passed back to lens 31 to be refracted back as 39*c* along the original non-axial path. Thus the device is tolerant of considerable angular misalignment.

FIG. 5 shows still another possible version of a structure suitable for use as the remote terminal in the FIG. 2 showing. This device is capable of much larger modulation frequencies because it is non-mechanical. A rear surface 50 percent beam splitter 50 and compensating plate 51 apply equal fractions of the optical input to electro-optical modulator crystals 52 and 53. The axes of crystals 52 and 53 are oriented to accommodate one polarization state each of the dual polarization input. That is crystals 52 and 53 are orthogonally oriented. Each crystal has a lens 54 and reflector 55 to provide retroreflective action. To achieve modulation, at least one of the crystals is electrically modulated by well known means 56 which provides suitable bias and modulation from an electrical input signal. This will vary the refractive index of the crystal and thereby phase modulate the associated optical transmission. For example, depending upon the nature of the crystal, it can be modulated by an electrostatic field or a magnetic field. Furthermore, the crystal could be modulated with a radio frequency field, that is, in turn, modulated with the electrical input signal. If desired both crystals can be modulated in push pull fashion to increase modulation sensitivity. Since electro-optical crystals can be modulated very rapidly, they are capable of producing very large optical modulation bandwidths.

While only two systems and several equivalent devices have been shown and described, numerous alternatives will occur to any person skilled in the art. It is intended that the scope of the invention be limited only by the following claims.

We claim:

1. An improved remote terminal intended for use in an optical retrocommunications system, said system having, in addition to said remote terminal, a base terminal comprising an optical transmitter and an optical receiver, said transmitter emitting optical energy directed at said remote terminal and said optical receiver receiving optical energy reflected from said remote terminal to recover information impressed on said optical energy at said remote terminal, wherein said improvement comprises:

a. two retrodirective reflectors, each capable of receiving a portion of said emitted optical energy from said optical transmitter and returning a portion of said emitted optical energy to said receiver, and b. means for phase modulating the reflection of one of said reflectors relative to the reflection of the other of said reflectors.

2. The improvement of claim 1 wherein said two retrodirective reflectors are modulated differentially.

3. The improvement of claim 1 wherein said reflectors comprise corner cubes and said means for modulating includes means for moving at least one reflector in a direction parallel to the optical path.

4. The improvement of claim 1 wherein said reflectors comprise cats eyes and said means for modulating includes means for moving at least one reflector in a direction parallel to the optical path.

5. The improvement of claim 1 wherein said means for modulating comprise at least one electro-optical crystal.

6. The system of claim 1 wherein said transmitter is further characterized as being of the dual-polarization laser type, said dual polarization laser having two orthogonally polarized outputs, said two retrodirective reflectors include further means for making each reflector responsive to a preferred light polarization orthogonally oriented with respect to the preferred light polarization of other reflector, and said receiver includes means for heterodyning orthogonally polarized input signals.

7. The system of claim 6 wherein said dual-polarization laser is adjusted to have a predetermined frequency difference between said two outputs, and said receiver includes a demodulator tuned to said frequency difference.

8. An optical retrocommunications system comprising:

a. a base terminal having an optical transmitter and an optical receiver, said transmitter producing at least two optical output beams orthogonally polarized with respect to each other, said two beams having a predetermined optical frequency difference, said receiver having optical input means capable of heterodyning said two beams to produce an electrical signal having a frequency equal to said optical frequency difference, said receiver including demodulator means tuned to said electrical signal, and a. a remote terminal having means for separately retroreflecting said two beams and means for varying the phase of reflection of one optical beam with respect to the phase of the other optical beam.

9. The system of claim 8 wherein said remote terminal comprises two retroreflectors, and said means for varying the phase of reflection includes means for moving at least one of said retroreflectors in accordance with a desired information signal.

10. The system of claim 8 wherein said remote terminal comprises two retroreflectors, and said means for varying the phase of reflection includes an electro optical device having the capability of varying the optical path length in accordance with an electrical signal.

* * * * *